(12) United States Patent
Hakola et al.

(10) Patent No.: US 8,891,448 B2
(45) Date of Patent: Nov. 18, 2014

(54) INTERFERENCE CONTROL

(75) Inventors: Sami-Jukka Hakola, Kempele (FI); Jorma Kaikkonen, Oulu (FI); Arto Lehti, Oulu (FI)

(73) Assignee: Nokia Corporation, Espoo (FI)

( * ) Notice: Subject to any disclaimer, the term of this patent is extended or adjusted under 35 U.S.C. 154(b) by 94 days.

(21) Appl. No.: 13/257,576

(22) PCT Filed: Mar. 16, 2010

(86) PCT No.: PCT/FI2010/050198
§ 371 (c)(1),
(2), (4) Date: Jan. 6, 2012

(87) PCT Pub. No.: WO2010/106227
PCT Pub. Date: Sep. 23, 2010

(65) Prior Publication Data
US 2012/0099444 A1    Apr. 26, 2012

Related U.S. Application Data

(60) Provisional application No. 61/210,271, filed on Mar. 17, 2009.

(51) Int. Cl.
*H04W 4/00* (2009.01)
*H04W 52/34* (2009.01)
*H04W 52/36* (2009.01)
*H04W 52/24* (2009.01)
*H04W 52/40* (2009.01)
*H04W 36/18* (2009.01)

(52) U.S. Cl.
CPC ............ *H04W 52/40* (2013.01); *H04W 52/346* (2013.01); *H04W 52/36* (2013.01); *H04W 52/242* (2013.01); *H04W 36/18* (2013.01)
USPC .......................................... 370/328

(58) Field of Classification Search
CPC . H04W 52/04; H04W 28/0221; H04W 40/02; H04W 10/08; H04W 40/10; H04W 52/0216; H04W 52/08; H04W 52/10; H04W 52/143
See application file for complete search history.

(56) References Cited

U.S. PATENT DOCUMENTS

2004/0209579 A1*  10/2004  Vaidyanathan ................ 455/101
2005/0135312 A1*   6/2005  Montojo et al. ............... 370/335

(Continued)

FOREIGN PATENT DOCUMENTS

CN        1894867         1/2007
WO    2008/057791 A1     5/2008

OTHER PUBLICATIONS

"3rd Generation Partnership Project; Technical Specification Group Radio Access Network; Medium Access Control (MAC) protocol specification (Release 8), Section 11.8.1.4: E-TFC Selection and Section 11.8.1.5: Happy Bit Setting", 3GPP TS 25.321, V8.4.0, Dec. 2008, pp. 129-133.

(Continued)

*Primary Examiner* — Raj Jain
(74) *Attorney, Agent, or Firm* — Nokia Corporation

(57) ABSTRACT

A method for controlling interference is described. The method includes receiving an indication that a first carrier is not received by a first base station and a second carrier is received by the first base station (610). Assigning a maximum transmission power for the first carrier so as not to exceed a transmission power for the second carrier is also included (620). The method also includes simultaneously transmitting from a UE on at least the first carrier and the second carrier. Transmitting on the first carrier is performed in accordance with the maximum assigned transmission power (630). Apparatuses and computer readable media are also described.

20 Claims, 5 Drawing Sheets

(56) References Cited

U.S. PATENT DOCUMENTS

2007/0178930 A1 8/2007 Xiao et al.
2008/0188260 A1 8/2008 Xiao et al.
2011/0116577 A1* 5/2011 Beamish .................. 375/317

OTHER PUBLICATIONS

"3rd Generation Partnership Project; Technical Specification Group Radio Access Network; Physical layer procedures (FDD) (Release 8), Section 5.1.2.6: Maximum and minimum power limits", 3GPP TS 25.214, V8.5.0, Mar. 2009, pp. 30-31.

International Search Report and Written Opinion received for corresponding Patent Cooperation Treaty Application No. PCT/FI2010/050198, dated Jun. 29, 2010, 11 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300, V8.7.0, Dec. 2008, pp. 1-144.

Office Action received for corresponding Chinese Application No. 201080012469.7, dated Aug. 23, 2013, 7 pages.

Office action received for corresponding Chinese Patent Application No. 201080012469.7, dated May 12, 2014, 4 pages of Office Action, No English Language Translation available.

Office action received for corresponding Indonesian Patent Application No. W00201103724, dated Feb. 27, 2014, 2 pages of Office Action and 2 pages of Office Action Translation.

* cited by examiner

INTERFERENCE CONTROL

RELATED APPLICATION

This application was originally filed as PCT Application No. PCT/FI2010/050198 on March. 16, 2010 and claims priority to US Provisional Application No. 61/210271 filed on March. 17, 2009, which is incorporated herein by reference in its entirety.

TECHNICAL FIELD

The exemplary and non-limiting embodiments of this invention relate generally to wireless communication systems, methods, devices and computer programs and, more specifically, relate to interference control in single carrier/dual carrier mixed deployments.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

| | |
|---|---|
| 3GPP | third generation partnership project |
| CDM | code division multiplexing |
| DL | downlink (Node B towards UE) |
| E-DCH | enhanced dedicated channel |
| eNB | E-UTRAN Node B (evolved Node B) |
| EPC | evolved packet core |
| E-RGCH | E-DCH relative grant channel |
| E-UTRAN | evolved UTRAN (LTE) |
| HARQ | hybrid automatic repeat request |
| HSDPA | high speed downlink packet access |
| HS-DSCH | high speed downlink shared channel |
| HSPA | high speed packet access |
| HSUPA | high speed uplink packet access |
| LTE | long term evolution of UTRAN (E-UTRAN) |
| MAC | medium access control (layer 2, L2) |
| MM/MME | mobility management/mobility management entity |
| Node B | base station |
| O&M | operations and maintenance |
| OFDMA | orthogonal frequency division multiple access |
| PDCP | packet data convergence protocol |
| PHY | physical (layer 1, L1) |
| RLC | radio link control |
| RRC | radio resource control |
| RRM | radio resource management |
| SC-FDMA | single carrier, frequency division multiple access |
| S-GW | serving gateway |
| SHO | soft handover |
| SIR | signal-to-interference ratio |
| UE | user equipment, such as a mobile station or mobile terminal |
| UL | uplink (UE towards Node B) |
| UTRAN | universal terrestrial radio access network |

A communication system known as evolved UTRAN (E-UTRAN, also referred to as UTRAN-LTE or as E-UTRA) has been specified within 3GPP. The DL access technique is OFDMA, and the UL access technique is SC-FDMA.

One specification of interest is 3GPP TS 36.300, V8.7.0 (2009-01), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8)".

FIG. 2 reproduces FIG. 4-1 of 3GPP TS 36.300, and shows the overall architecture of the E-UTRAN system. The E-UTRAN system includes eNBs, providing the E-UTRA user plane (PDCP/RLC/MAC/PHY) and control plane (RRC) protocol terminations towards the UE (not shown). The eNBs are interconnected with each other by means of an X2 interface. The eNBs are also connected by means of an S1 interface to an EPC, more specifically to a MME (Mobility Management Entity) by means of a S1 MME interface and to a Serving Gateway (SGW) by means of a S1 interface. The S1 interface supports a many-to-many relationship between MMEs/S-GW and eNBs.

The eNB hosts the following functions:
- functions for RRM: Radio Bearer Control, Radio Admission Control, Connection Mobility Control, Dynamic allocation of resources to UEs in both UL and DL (scheduling);
- IP header compression and encryption of the user data stream;
- selection of a MME at UE attachment;
- routing of User Plane data towards the Serving Gateway;
- scheduling and transmission of paging messages (originated from the MME);
- scheduling and transmission of broadcast information (originated from the MME or O&M); and
- a measurement and measurement reporting configuration for mobility and scheduling.

In Release 8 (Rel-8) of HSPA standardization in 3GPP dual carrier HSDPA was specified in the downlink. In deployments where multiple downlink carriers are available, this multi-carrier operation increases coverage for high bit rates. Rel 8 introduces dual-carrier operation in the downlink on adjacent carriers. This technique doubles the peak rate from 21 Mbps to 42 Mbps without the use of MIMO.

A dual-carrier UE can be scheduled in the primary serving cell as well as in a secondary serving cell over two parallel HS-DSCH transport channels. All non-HSDPA-related channels reside in the primary serving cell, and all physical layer procedures are essentially based on the primary serving cell. Either carrier can be configured to function as the primary serving cell for a particular UE. As a consequence, the dual-carrier feature also facilitates an efficient load balancing between carriers in one sector. As with MIMO, the two transport channels perform HARQ retransmissions, coding and modulation independently. A difference compared to MIMO is that the two transport blocks can be transmitted on their respective carriers using a different number of channelization codes. In terms of complexity, adding a dual-carrier receiver to UEs is roughly comparable to adding a MIMO receiver. Because the two 5 MHz carriers are adjacent, they can be received using a single 10 MHz radio receiver.

In dual carrier HSUPA the UE may be assigned one or two UL carriers for data transmission (if the UE is dual carrier capable). As compared to DL multi-carrier operation, where the UE is required to receive the multi-carrier transmission transmitted by the Node B, in the UL the UE is power limited and thus it needs to share its transmission power among the carriers if it transmits on both carriers simultaneously. Both inner and outer power control loops need to be active on each carrier to maintain synchronization and achieve a desired SIR target.

In future deployments of HSPA networks it is expected that there will be Node Bs that support different releases of the HSPA standard. In other words there may be some Node Bs that support only conventional single carrier HSUPA operation, and some Node Bs that support dual carrier HSUPA operation. In addition, single carrier capable Node Bs may control the same carriers as the dual carrier capable Node Bs.

SUMMARY

The below summary section is intended to be merely exemplary and non-limiting.

The foregoing and other problems are overcome, and other advantages are realized, by the use of the exemplary embodiments of this invention.

In a first aspect thereof an exemplary embodiment of this invention provides a method for controlling interference. The method includes receiving (e.g., via a receiver) an indication that a first carrier is not received by a first base station and a second carrier is received by the first base station. Assigning (e.g., by a processor) a maximum transmission power for the first carrier so as not to exceed a transmission power for the second carrier is also included. The method also includes simultaneously transmitting (e.g., via a transmitter) from a UE on at least the first carrier and the second carrier. Transmitting on the first carrier is performed in accordance with the maximum assigned transmission power.

In another aspect thereof an exemplary embodiment of this invention provides an apparatus for controlling interference. The apparatus includes at least one processor and at least one memory which includes computer program code. The at least one memory and the computer program code are configured to, with the at least one processor, cause the apparatus to perform actions. The actions include to receive an indication that a first carrier is not received by a first base station and a second carrier is received by the first base station; to assign a maximum transmission power for the first carrier so as not to exceed a transmission power for the second carrier; and to simultaneously transmit on at least the first carrier and the second carrier. Transmitting on the first carrier is performed in accordance with the maximum assigned transmission power.

In a further aspect thereof an exemplary embodiment of this invention provides a computer readable medium for controlling interference. The computer readable medium is tangibly encoded with a computer program executable by a processor to perform actions. The actions include receiving an indication that a first carrier is not received by a first base station and a second carrier is received by the first base station; assigning a maximum transmission power for the first carrier so as not to exceed a transmission power for the second carrier; and simultaneously transmitting from a UE on at least the first carrier and the second carrier. Transmitting on the first carrier is performed in accordance with the maximum assigned transmission power.

In another aspect thereof an exemplary embodiment of this invention provides an apparatus for controlling interference. The apparatus includes means for receiving (e.g., a receiver) an indication that a first carrier is not received by a first base station and a second carrier is received by the first base station; means for assigning (e.g., a processor), a maximum transmission power for the first carrier so as not to exceed a transmission power for the second carrier; and means for simultaneously transmitting (e.g., a transmitter) from a UE on at least the first carrier and the second carrier. Transmitting on the first carrier is performed in accordance with the maximum assigned transmission power.

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION

The exemplary embodiments of this invention relate at least in part to the evolution of the HSPA standards in 3GPP, such as to Release 9 studies of the HSPA track. Within the Release 9 framework a work item for UL dual carrier UE operation has been launched.

Figure 1:
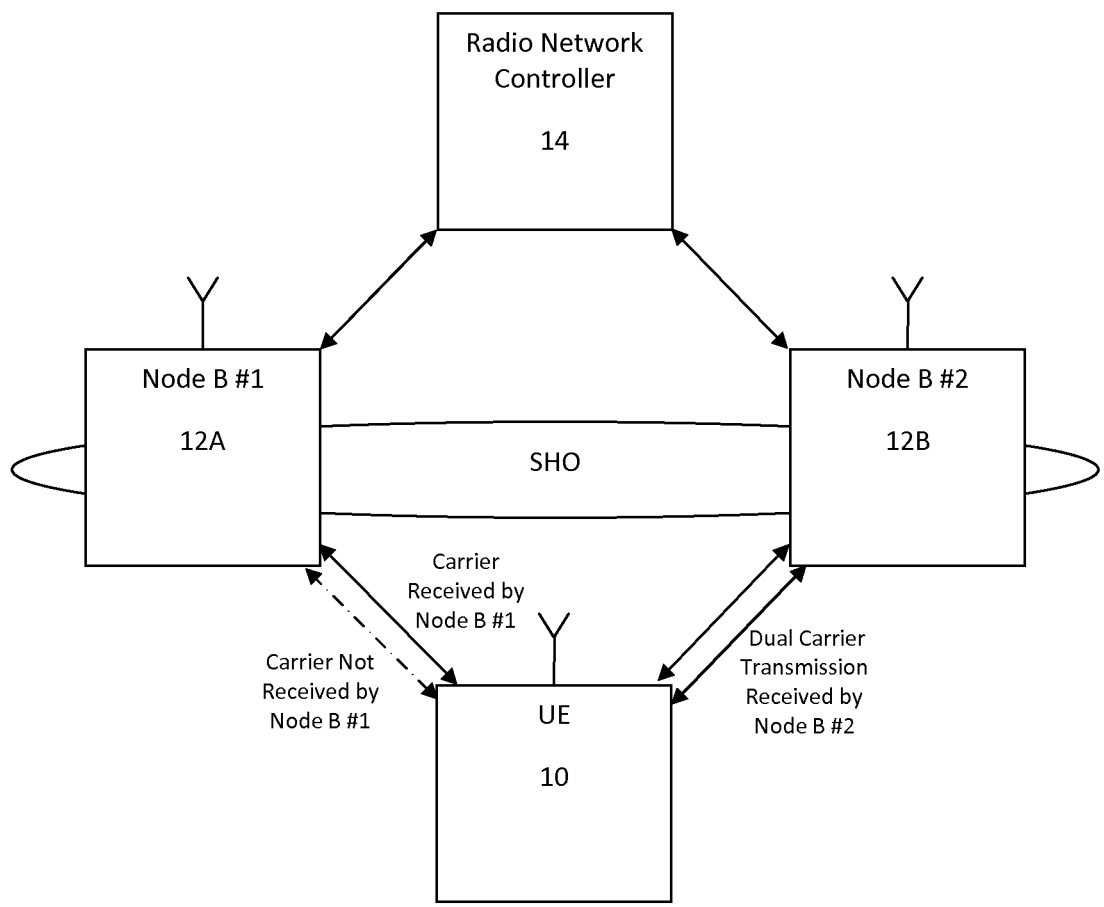
FIG. 1 depicts an exemplary multi-carrier UL HSUPA deployment scenario and is useful for describing the exemplary embodiments of this invention.

FIG. 1 depicts an exemplary deployment scenario within which the problems discussed above may arise. This Figure assumes the presence of a dual UL carrier capable UE 10, a first Node B 12A and a second Node B 12B disposed relative to one another for establishing a SHO region or area for the UE 10, and a radio network controller (RNC) 14. In this non-limiting deployment example the first Node B 12A is assumed to not support the reception of a dual channel UL transmission from the UE 10, but is handling the same set of carriers individually. The second Node B 12B is assumed to support the reception of a dual channel UL transmission from the UE 10.

It may be assumed that when the UE 10 is in the dual carrier HSUPA transmission mode the serving cell shall be the same for both UL carriers in order to have a dual carrier scheduler at the serving Node B 12B. Thus, if the UE 10 and serving cell supports dual carrier HSUPA operation, the RNC 14 can assign dual carrier transmission mode for the UE 10. Furthermore, in the uplink the UE 10 may be in SHO. There may thus be a situation where the UE 10 in dual carrier mode is signaled to be in SHO, and the Node B 12A handling the cells (in the active set) other than the serving cell may not support dual carrier UL transmission. As a result the UE 10 may have different active sets for the carriers that it is using. Further, from a UE 10 implementation point of view it may be preferred if all control channels related to dual carrier UL transmission were transmitted on one DL carrier only. In this case the Node B 12A that is receiving only one of the carriers of the dual carrier UE 10 (the Node B #1 in FIG. 1) cannot control interference that is caused by the UE 10 transmission on the other carrier of the dual carrier pair.

Note that the control channel may be transmitted from the serving cell and also from other cells in the active set. In this case the control channels from cells in the active sets of both UL carriers are mapped to one DL carrier.

One possible solution to the problem discussed above is to not allow SHO for dual carrier transmission. However, this solution is generally not acceptable, as it can be observed from simulations that even SHO users benefit from dual carrier transmission in terms of burst rate improvement.

Another possible solution to this problem is to allow only the same active sets for both carriers. However, for example, there may be Node Bs that do not support dual carrier UL transmission but are able to receive a transmission on one carrier from the UE 10 transmitting on two carriers, e.g., Node B 12A. Thus, there may be a performance gain by allowing different active set sizes for carriers per UE, with the condition that the serving cell is the same for both carriers.

Another possible solution to this problem is to simply accept the interference at the Node B 12A.

Another possible solution to this problem is to arrange the control signaling for UL dual carrier transmission to not be transmitted on one DL carrier only, but on two DL carriers. In other words, one DL carrier corresponds to one UL carrier. In this case the Node B 12A that does not support dual carrier transmission (not the serving cell) can still receive the dual carrier transmission and control interference via the E-RGCH. Note that this Node B 12A may still transmit DL control information to the UE 10 regarding the UL carrier that it does not support, if this Node B 12A is handling two carriers in a single-carrier manner.

In accordance with the exemplary embodiments of this invention, and because the RNC 14 updates the active set for the UE 10 on both carriers, the UE 10 knows whether the active sets are the same or different. To reduce the possibility of causing interference at the Node B 12A on a carrier that the Node B 12A does not receive from a dual carrier UE 10 transmission (but receives on the other carrier) rules may be used to define how the UE 10 uses the allowed grant on the carrier in question. In addition, the RNC 14 may signal, together with the active set update signaling, if interference reduction shall or shall not be performed on a certain carrier (note that this additional signaling may not be needed if the affected Node B 12A does not control/receive on another carrier other than the one it receives from the UE 10).

The rules may be based on, as a non-limiting example, a path loss (which represents a comparison of transmission power to received power) for the serving cell Node B 12B (e.g., Node B #2) and a path loss for the affected Node B 12A (Node B #1). The UE 10 may be configured to calculate path loss for both the Node B 12A and the Node B 12B from the DL transmissions of the separate Node Bs in the active set. For example, if the path loss measurements indicate that the UE 10 is near to the affected Node B 12A, the use of the grant for E-DCH transmission may be restricted. For example, there may be a backoff offset as a function of a path loss ratio between the serving cell Node B 12B and the affected Node B 12A, or the maximum allowed grant is a function of the path loss ratio. In addition, the UE 10 may signal (possibly by using happy bits or some similar mechanism) on that carrier to the serving Node B 12B that the Node B 12B may reduce grants on that carrier. This approach may be implementation specific in the Node B 12B scheduler. For example, if the UE 10 continuously sends happy bit indications the Node B 12B may reduce the grant until the UE 10 sends an unhappy bit indication.

In one exemplary embodiment, the RNC 14 may receive the path loss measurements from the UE 10 and determine the power allocated to the carrier where the interference should be controlled.

Further in accordance with the exemplary embodiments of this invention, another approach is that the maximum transmission power on the carrier where the interference should be controlled cannot exceed the transmission power (or shall be lower than the transmission power by some offset amount) of the carrier to which the affected Node B 12A can send power control commands (e.g. E-RGCH), or the transmission power on the carrier where the interference should be controlled is maintained to be less than (e.g., by some offset amount) or equal to the transmission power on the other carrier so that other powers (other channels) are not reduced when needed. For example, in this regard if power needs to be reduced on a carrier it can be accomplished by decreasing the E-DPDCH gain factor to be used, and the power of other channels remains.

Further in accordance with the exemplary embodiments of this invention, another approach is that the maximum transmission power on the carrier where the interference should be controlled is maintained less than (by some offset amount) or equal to the maximum allowed transmission power on the other carrier so that other powers (other channels) are not reduced when needed. Note that it might be the case that the other carrier does not use all of the allowed grants. Note that this approach is similar to that discussed in the preceding paragraph, but here the first carrier may not use all of the granted power (allowed), while the reduction of the power on the other carrier is based on the allowed power on the first carrier.

Figure 3:
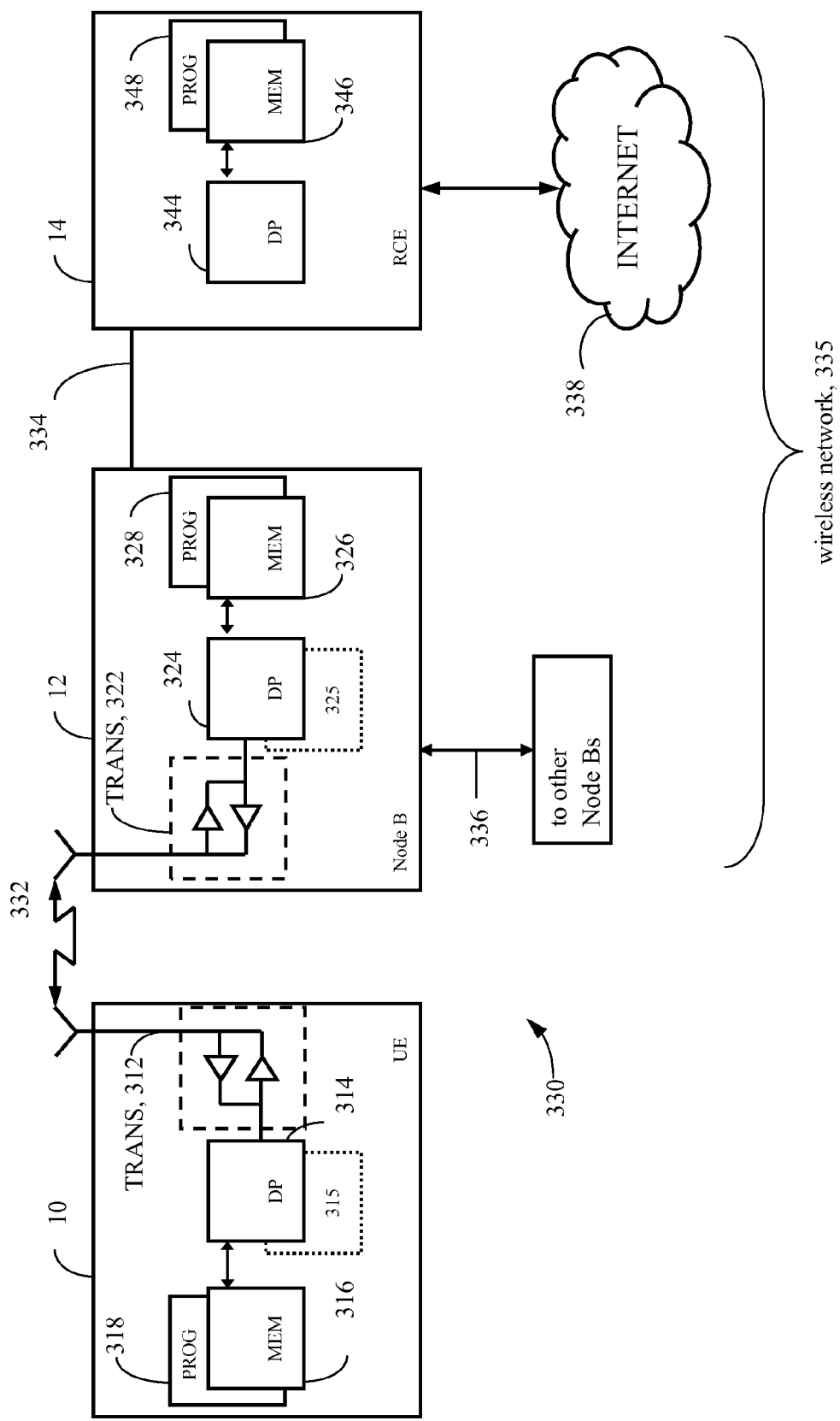
FIG. 3 shows a simplified block diagram of exemplary electronic devices that are suitable for use in practicing various exemplary embodiments of this invention.

Before describing in further detail various exemplary embodiments of this invention, reference is made to FIG. 3 for illustrating a simplified block diagram of various electronic devices and apparatus that are suitable for use in practicing exemplary embodiments of this invention.

Figure 2:
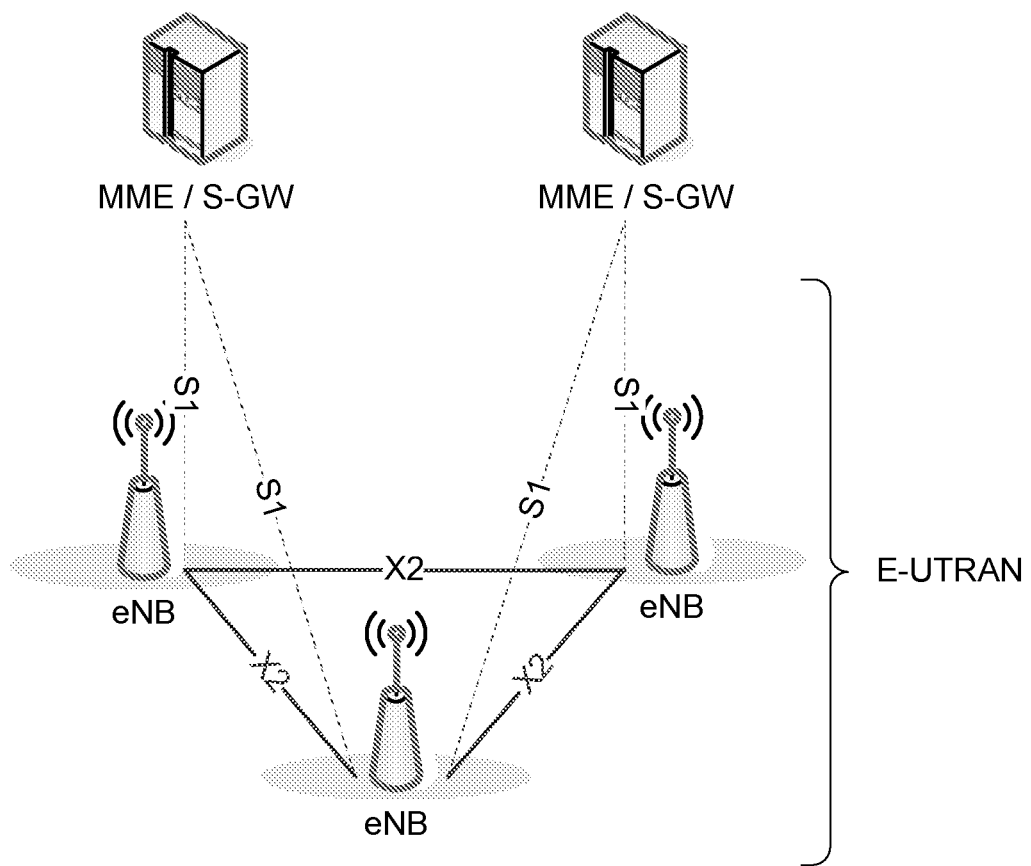
FIG. 2 reproduces FIG. 4-1 of 3GPP TS 36.300, and shows the overall architecture of the E-UTRAN system.

In the wireless system 330 of FIG. 3, a wireless network 335 is adapted for communication over a wireless link 332 with an apparatus, such as a mobile communication device which may be referred to as a UE 10, via a network access node, such as a Node B (base station) 12, or more specifically an eNB. The network 335 may include a network control element (NCE), such as RNC 14, that may include the MME/SGW functionality shown in FIG. 2, and which provides connectivity with a network, such as a telephone network and/or a data communications network (e.g., the internet 338).

The UE 10 includes a controller, such as a computer or a data processor (DP) 314, a computer-readable memory medium embodied as a memory (MEM) 316 that stores a program of computer instructions (PROG) 318, and a suitable wireless interface, such as radio frequency (RF) transceiver 312, for bidirectional wireless communications with the Node B 12 via one or more antennas.

The Node B 12 also includes a controller, such as a computer or a data processor (DP) 324, a computer-readable memory medium embodied as a memory (MEM) 326 that stores a program of computer instructions (PROG) 328, and a suitable wireless interface, such as RF transceiver 322, for communication with the UE 10 via one or more antennas. The Node B 12 is coupled via a data/control path 334 to the RNC 14. The path 334 may be implemented as the S1 interface shown in FIG. 2. The Node B 12 may also be coupled to another Node B 12 via data/control path 336, which may be implemented as the X2 interface shown in FIG. 2.

The RNC 14 includes a controller, such as a computer or a data processor (DP) 344, a computer-readable memory medium embodied as a memory (MEM) 346 that stores a program of computer instructions (PROG) 348.

For the purposes of describing the exemplary embodiments of this invention the UE 10 may be assumed to also include a measurement unit 315, such as one suitable for making the path loss measurements discussed above, and the Node B 12 may include a scheduler 325. The Node B 12 may be assumed to be either of the Node B 12A or the Node B 12B shown in FIG. 1, where in one case the RF receiver is not capable of simultaneous multi-carrier UL reception from the UE 10, while in the other case the RF receiver is capable of simultaneous multi-carrier UL reception from the UE 10.

At least one of the PROGs 318, 328 and 348 is assumed to include program instructions that, when executed by the associated DP, enable the device to operate in accordance with exemplary embodiments of this invention, as will be discussed below in greater detail.

That is, various exemplary embodiments of this invention may be implemented at least in part by computer software executable by the DP 314 of the UE 10; by the DP 324 of the Node B 12; and/or by the DP 344 of the RNC 14, or by hardware, or by a combination of software and hardware (and firmware).

The UE 10 and the Node B 12 may also include dedicated processors, for example measurement unit 315 and scheduler 325.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 316, 326 and 346 may be of any type suitable to the local technical environment and may be implemented using any suitable data storage technology, such as semiconductor based memory devices, flash memory, magnetic memory devices and systems, optical memory devices and systems, fixed memory and removable memory. The DPs 314, 324 and 344 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 312 and 322) may be of any type suitable to the local technical environment and may be implemented using any suitable communication technology such as individual transmitters, receivers, transceivers or a combination of such components.

Figure 4:
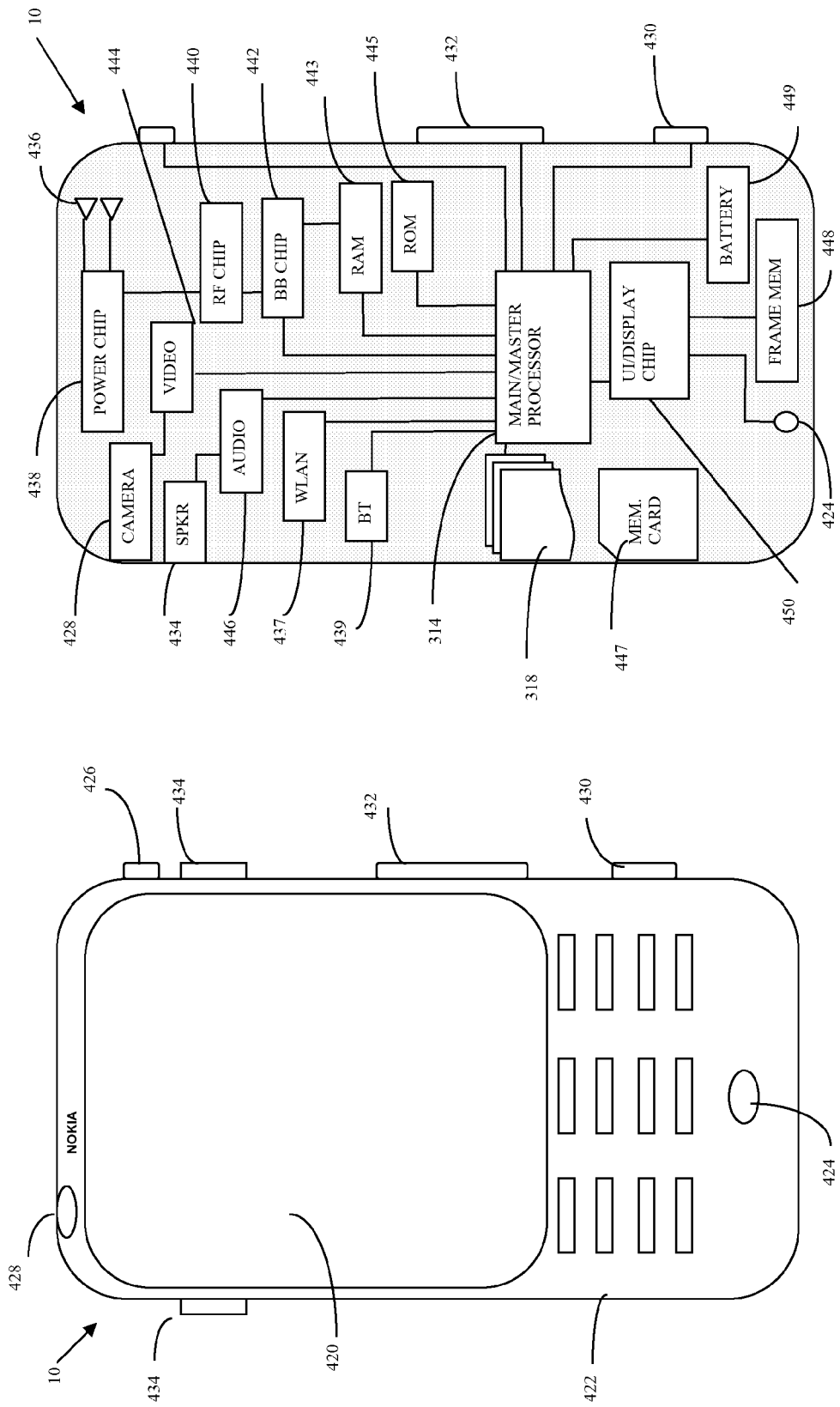
FIG. 4 shows a more particularized block diagram of an exemplary user equipment such as that shown at FIG. 3.

FIG. 4 illustrates further detail of an exemplary UE in both plan view (left) and sectional view (right), and the invention may be embodied in one or some combination of those more function-specific components. At FIG. 4 the UE 10 has a graphical display interface 420 and a user interface 422 illustrated as a keypad but understood as also encompassing touch-screen technology at the graphical display interface 420 and voice-recognition technology received at the microphone 424. A power actuator 426 controls the device being turned on and off by the user. The exemplary UE 10 may have a camera 428 which is shown as being forward facing (e.g., for video calls) but may alternatively or additionally be rearward facing (e.g., for capturing images and video for local storage). The camera 428 is controlled by a shutter actuator 430 and optionally by a zoom actuator 432 which may alternatively function as a volume adjustment for the speaker(s) 434 when the camera 428 is not in an active mode.

Within the sectional view of FIG. 4 are seen multiple transmit/receive antennas 436 that are typically used for cellular communication. The antennas 436 may be multi-band for use with other radios in the UE. The operable ground plane for the antennas 436 is shown by shading as spanning the entire space enclosed by the UE housing though in some embodiments the ground plane may be limited to a smaller area, such as disposed on a printed wiring board on which the power chip 438 is formed. The power chip 438 controls power amplification on the channels being transmitted and/or across the antennas that transmit simultaneously where spatial diversity is used, and amplifies the received signals. The power chip 438 outputs the amplified received signal to the radio-frequency (RF) chip 440 which demodulates and downconverts the signal for baseband processing. The baseband (BB) chip 442 detects the signal which is then converted to a bit-stream and finally decoded. Similar processing occurs in reverse for signals generated in the apparatus 10 and transmitted from it.

For the purposes of describing various exemplary embodiments of this invention it may be assumed that the RF circuitry is capable of simultaneous multi-carrier UL transmission operation.

Signals to and from the camera 428 pass through an image/video processor 444 which encodes and decodes the various image frames. A separate audio processor 446 may also be present controlling signals to and from the speakers 434 and the microphone 424. The graphical display interface 420 is refreshed from a frame memory 448 as controlled by a user interface chip 450 which may process signals to and from the display interface 420 and/or additionally process user inputs from the keypad 422 and elsewhere.

Certain embodiments of the UE 10 may also include one or more secondary radios such as a wireless local area network radio WLAN 437 and a Bluetooth® radio 439, which may incorporate an antenna on-chip or be coupled to an off-chip antenna. Throughout the apparatus are various memories such as random access memory RAM 443, read only memory ROM 445, and in some embodiments removable memory such as the illustrated memory card 447. The various programs 318 are stored in one or more of these memories. All of these components within the UE 10 are normally powered by a portable power supply such as a battery 449.

Processors 438, 440, 442, 444, 446, 450, if embodied as separate entities in a UE 10 or Node B 12, may operate in a slave relationship to the main processor 314, 324, which may then be in a master relationship to them. Embodiments of this invention are most relevant to the RF circuitry, though it is noted that other embodiments need not be disposed there but may be disposed across various chips and memories as shown or disposed within another processor that combines some of the functions described above for FIG. 4. Any or all of these various processors of FIG. 4 access one or more of the various memories, which may be on-chip with the processor or separate therefrom. Similar function-specific components that are directed toward communications over a network broader than a piconet (e.g., components 436, 438, 440, 442-445 and 447) may also be disposed in exemplary embodiments of the access node 12, which may have an array of tower-mounted antennas rather than the two shown at FIG. 4.

Note that the various chips (e.g., 438, 440, 442, etc.) that were described above may be combined into a fewer number than described and, in a most compact case, may all be embodied physically within a single chip.

Based on the foregoing it should be apparent that the exemplary embodiments of this invention provide a method, apparatus and computer program(s) to reduce an occurrence of interference on a carrier of a set of multi-carriers simultaneously transmitted by a user equipment towards a base station that is not capable of simultaneously receiving and power controlling all of the simultaneously transmitted multi-carriers.

Figure 5:
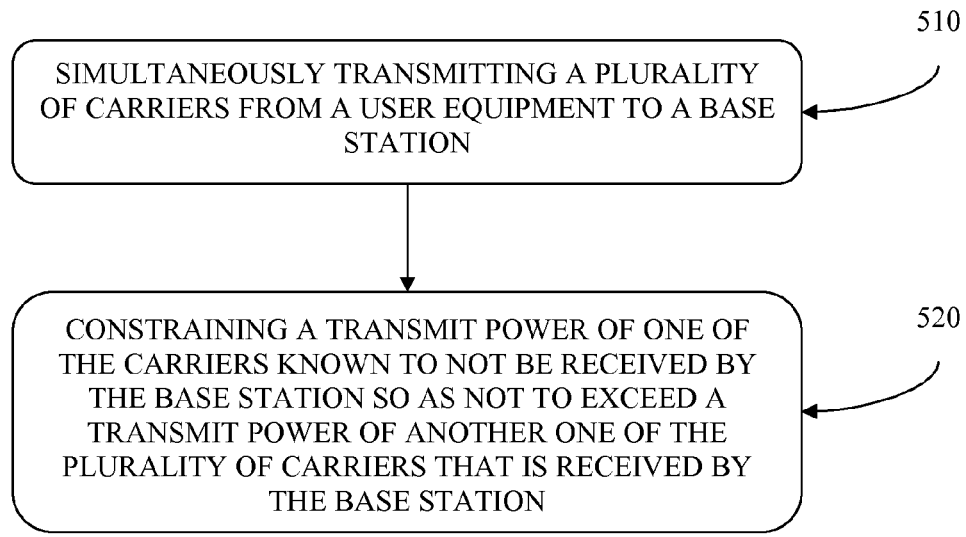
FIG. 5 is a logic flow diagram that illustrates the operation of a method, and a result of execution of computer program instructions embodied on a computer readable memory, in accordance with the exemplary embodiments of this invention.

(A) FIG. 5 is a logic flow diagram that illustrates the operation of a method, and a result of execution of computer program instructions, in accordance with the exemplary embodiments of this invention. In accordance with these exemplary embodiments a method performs, at Block 510, a step of simultaneously transmitting a plurality of carriers from a user equipment to a base station; and at Block 520, the user equipment constraining a transmit power of one of the carriers known to not be received by the base station so as not to exceed a transmit power of another one of the plurality of carriers that is received by the base station.

(B) The method, and the result of execution of computer program instructions as in paragraph (A), where constraining is accomplished based on at least one rule, where the at least one rule is related to a path loss ratio between the base station and another base station.

(C) The method, and the result of execution of computer program instructions as in paragraph (B), where constraining uses one of a transmit power backoff offset as a function of the path loss ratio, or a maximum allowed grant is made a function of the path loss ratio.

(D) The method, and the result of execution of computer program instructions as in paragraph (B), where the other base station is a serving base station, and where the user equipment signals on that carrier to the serving base station that the serving base station may reduce grants on that carrier.

(E) The method, and the result of execution of computer program instructions as in paragraph (A), where constraining limits the maximum transmission power on the one of the carriers to not exceed the transmission power of a carrier to which base station is capable of sending power control related commands to the user equipment.

(F) The method, and the result of execution of computer program instructions as in paragraph (A), where constraining limits the maximum transmission power on the one of the carriers to not exceed the transmission power of the other carrier so that the transmission power of other channels are not reduced.

(G) The method, and the result of execution of computer program instructions as in paragraph (A), where constraining limits the maximum transmission power on the one of the carriers to not exceed the allowed transmission power of the other carrier, even if the other carrier is not being transmitted with allowed transmission power, so that the transmission power of other channels are not reduced.

(H) The method, and the result of execution of computer program instructions as in any one of the preceding paragraphs, further comprising receiving an indication from a radio network controller as to whether the transmission power of the carrier needs to be constrained.

(I) The method, and the result of execution of computer program instructions as in any one of the preceding paragraphs, executed during a soft handover procedure between the base station and a serving base station, where the serving base station is capable of receiving all of the simultaneously transmitted plurality of carriers.

The exemplary embodiments of this invention also encompass an apparatus that comprises a controller configured with a transmitter of a user equipment to simultaneously transmit a plurality of carriers from the user equipment to a base station, and to constrain a transmit power of one of the carriers known to not be received by the base station so as not to exceed a transmit power of another one of the plurality of carriers that is received by the base station, thereby mitigating interference caused by the one of the carriers at the base station.

Figure 6:
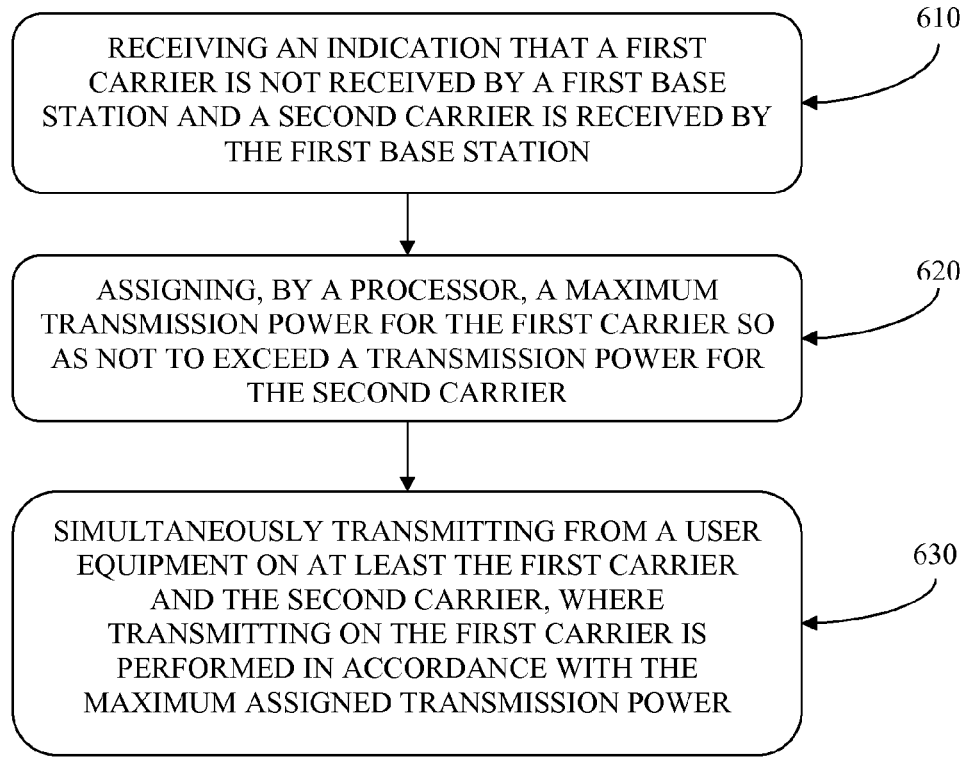
FIG. 6 is a logic flow diagram that illustrates the operation of an exemplary method, and a result of execution of computer program instructions embodied on a computer readable memory, in accordance with various exemplary embodiments of this invention.

FIG. 6 is a logic flow diagram that illustrates the operation of a method, and a result of execution of computer program instructions, in accordance with the exemplary embodiments of this invention. In accordance with these exemplary embodiments a method performs, at Block 610, a step of receiving an indication that a first carrier is not received by a first base station and a second carrier is received by the first base station. Assigning a maximum transmission power for the first carrier so as not to exceed a transmission power for the second carrier is performed at Block 620. The method also includes, at Block 630, simultaneously transmitting from a user equipment on at least the first carrier and the second carrier, where transmitting on the first carrier is performed in accordance with the maximum assigned transmission power.

The various blocks shown in FIGS. 5 and 6 may be viewed as method steps, and/or as operations that result from operation of computer program code, and/or as a plurality of coupled logic circuit elements constructed to carry out the associated function(s).

An exemplary embodiment in accordance with this invention is a method for controlling interference. The method includes receiving (e.g., via a receiver) an indication that a first carrier is not received by a first base station and a second carrier is received by the first base station. Assigning (e.g., by a processor) a maximum transmission power for the first carrier so as not to exceed a transmission power for the second carrier is also included. The method also includes simultaneously transmitting (e.g., via a transmitter) from a UE on at least the first carrier and the second carrier. Transmitting on the first carrier is performed in accordance with the maximum assigned transmission power.

In a further exemplary embodiment of the method above, assigning the maximum transmission power for the first carrier is based at least in part on one or more rules related to a first path loss between the UE and the first base station and a second path loss between the UE and a second base station. Assigning the maximum transmission power for the first carrier may use: a transmit power backoff offset as a function of a path loss ratio (e.g., a ratio between the first path loss and the second path loss) or a maximum allowed grant as a function of the path loss ratio. The second base station may be a serving base station, and the method may also include signaling on the first carrier to the serving base station that the serving base station may reduce grants on the first carrier.

In another exemplary embodiment of any one of the methods above, assigning the maximum transmission power for the first carrier assigns the maximum transmission power such that the maximum transmission power does not exceed a transmission power for the second carrier. The UE is configured to receive power control related commands from the first base station.

In a further exemplary embodiment of any one of the methods above, assigning the maximum transmission power assigns the maximum transmission power such that the maximum transmission power for the first carrier does not exceed a transmission power of the second carrier.

In another exemplary embodiment of any one of the methods above, assigning the maximum transmission power assigns the maximum transmission power such that the maximum transmission power does not exceed an allowed transmission power for the second carrier. A transmission power for the second carrier may be less than the allowed transmission power.

In a further exemplary embodiment of any one of the methods above, the method also includes calculating a first path loss between the UE and the first base station; calculating a second path loss between the UE and a second base station; and sending the first path loss and the second path loss to a radio network controller.

In another exemplary embodiment of any one of the methods above, the method also includes receiving instructions from a radio network controller to constrain the transmission power of the first carrier. Assigning the maximum transmission power is performed in response to receiving the instructions.

In a further exemplary embodiment of any one of the methods above, the method is executed during a SHO procedure between the first base station and a serving base station. The serving base station is configured to receive all of the plurality of carriers.

Another exemplary embodiment in accordance with this invention is an apparatus for controlling interference. The apparatus includes at least one processor and at least one memory which includes computer program code. The at least one memory and the computer program code are configured to, with the at least one processor, cause the apparatus to perform actions. The actions include to receive an indication that a first carrier is not received by a first base station and a second carrier is received by the first base station; to assign a maximum transmission power for the first carrier so as not to exceed a transmission power for the second carrier; and to simultaneously transmit on at least the first carrier and the second carrier. Transmitting on the first carrier is performed in accordance with the maximum assigned transmission power.

In a further exemplary embodiment of the apparatus above, assigning the maximum transmission power for the first carrier is based at least in part on at least one rule related to a first path loss between a UE and the first base station and a second path loss between the UE and a second base station. Assigning the maximum transmission power for the first carrier may use: a transmit power backoff offset as a function of the path loss ratio or a maximum allowed grant is a function of the path loss ratio. The second base station may be a serving base station, and the actions also include to signal on the first carrier to the serving base station that the serving base station may reduce grants on the first carrier.

In another exemplary embodiment of any one of the apparatus above, assigning the maximum transmission power for the first carrier assigns the maximum transmission power such that the maximum transmission power does not exceed a transmission power for the second carrier, where the apparatus is configured to receive power control related commands from the first base station.

In a further exemplary embodiment of any one of the apparatus above, assigning the maximum transmission power assigns the maximum transmission power such that the maximum transmission power for the first carrier does not exceed a transmission power of the second carrier.

In another exemplary embodiment of any one of the apparatus above, assigning the maximum transmission power assigns the maximum transmission power such that the maximum transmission power does not exceed an allowed transmission power for the second carrier.

In a further exemplary embodiment of any one of the apparatus above, a transmission power for the second carrier is less than the allowed transmission power.

In another exemplary embodiment of any one of the apparatus above, the actions also include to calculate a first path loss between a UE and the first base station; to calculate a second path loss between the UE and a second base station; and to send the first path loss and the second path loss to a radio network controller.

In a further exemplary embodiment of any one of the apparatus above, the actions also include to receive instructions from a radio network controller to constrain the transmission power of the first carrier, where assigning the maximum transmission power is performed in response to receiving the instructions.

In another exemplary embodiment of any one of the apparatus above, receiving, assigning and simultaneously transmitting are executed during a SHO procedure between the first base station and a serving base station, where the serving base station is configured to receive all of the plurality of carriers.

A further exemplary embodiment in accordance with this invention is an computer readable medium for controlling interference. The computer readable medium is tangibly encoded with a computer program executable by a processor to perform actions. The actions include receiving an indication that a first carrier is not received by a first base station and a second carrier is received by the first base station; assigning a maximum transmission power for the first carrier so as not to exceed a transmission power for the second carrier; and simultaneously transmitting from a UE on at least the first carrier and the second carrier. Transmitting on the first carrier is performed in accordance with the maximum assigned transmission power.

In another exemplary embodiment of the computer readable medium above, assigning the maximum transmission power for the first carrier is based at least in part on at least one rule related to a first path loss between the UE and the first base station and a second path loss between the UE and a second base station. Assigning the maximum transmission power for the first carrier may use: a transmit power backoff offset as a function of the path loss ratio or a maximum allowed grant is a function of the path loss ratio. The second base station may be a serving base station, and the actions further include signaling on the first carrier to the serving base station that the serving base station may reduce grants on the first carrier.

In a further exemplary embodiment of any one of the computer readable media above, assigning the maximum transmission power for the first carrier assigns the maximum transmission power such that the maximum transmission power does not exceed a transmission power for the second carrier. The UE is configured to receive power control related commands from the first base station.

In another exemplary embodiment of any one of the computer readable media above, assigning the maximum transmission power assigns the maximum transmission power such that the maximum transmission power for the first carrier does not exceed a transmission power of the second carrier.

In a further exemplary embodiment of any one of the computer readable media above, assigning the maximum transmission power assigns the maximum transmission power such that the maximum transmission power does not exceed an allowed transmission power for the second carrier.

In another exemplary embodiment of any one of the computer readable media above, a transmission power for the second carrier is less than the allowed transmission power.

In a further exemplary embodiment of any one of the computer readable media above, the actions also include calculating a first path loss between the UE and the first base station; calculating a second path loss between the UE and a second base station; and sending the first path loss and the second path loss to a radio network controller.

In another exemplary embodiment of any one of the computer readable media above, the actions also include receiving instructions from a radio network controller to constrain the transmission power of the first carrier. Assigning the maximum transmission power is performed in response to receiving the instructions.

In a further exemplary embodiment of any one of the computer readable media above, the actions are executed during a SHO procedure between the first base station and a serving base station, where the serving base station is configured to receive all of the plurality of carriers.

In another exemplary embodiment of any one of the computer readable media above, the computer readable medium is a non-transitory computer readable media (which may include RAM type media).

A further exemplary embodiment in accordance with this invention is an apparatus for controlling interference. The apparatus includes means for receiving (e.g., a receiver) an indication that a first carrier is not received by a first base station and a second carrier is received by the first base station; means for assigning (e.g., a processor), a maximum transmission power for the first carrier so as not to exceed a transmission power for the second carrier; and means for simultaneously transmitting (e.g., a transmitter) from a UE on at least the first carrier and the second carrier. Transmitting on the first carrier is performed in accordance with the maximum assigned transmission power.

In another exemplary embodiment of the apparatus above, assigning the maximum transmission power for the first carrier is based at least in part on at least one rule related to a first path loss between the UE and the first base station and a second path loss between the UE and a second base station. Assigning the maximum transmission power for the first carrier may use: a transmit power backoff offset as a function of the path loss ratio or a maximum allowed grant is a function of the path loss ratio. The second base station may be a serving base station, and the apparatus further comprises means for signaling (e.g., a transmitter) on the first carrier to the serving base station that the serving base station may reduce grants on the first carrier.

In a further exemplary embodiment of any one of the apparatus above, assigning the maximum transmission power for the first carrier assigns the maximum transmission power such that the maximum transmission power does not exceed a transmission power for the second carrier. The apparatus is configured to receive power control related commands from the first base station.

In another exemplary embodiment of any one of the apparatus above, assigning the maximum transmission power assigns the maximum transmission power such that the maximum transmission power for the first carrier does not exceed a transmission power of the second carrier.

In a further exemplary embodiment of any one of the apparatus above, assigning the maximum transmission power assigns the maximum transmission power such that the maximum transmission power does not exceed an allowed transmission power for the second carrier.

In another exemplary embodiment of any one of the apparatus above, a transmission power for the second carrier is less than the allowed transmission power.

In a further exemplary embodiment of any one of the apparatus above, the apparatus also includes means for calculating (e.g., a processor) a first path loss between the UE and the first base station; means for calculating (e.g., a processor) a second path loss between the UE and a second base station; and means for sending (e.g., a transmitter) the first path loss and the second path loss to a radio network controller.

In another exemplary embodiment of any one of the apparatus above, the apparatus also includes means for receiving (e.g., a receiver) instructions from a radio network controller to constrain the transmission power of the first carrier. Assigning the maximum transmission power is performed in response to receiving the instructions.

In a further exemplary embodiment of any one of the apparatus above, the receiving means, assigning means and transmitting means are used during a SHO procedure between the first base station and a serving base station. The serving base station is configured to receive all of the plurality of carriers.

In general, the exemplary embodiments of this invention may provide enhancements to certain standard specifications, such as to 3GPP TS 25.214 V8.5.0 (2009-03) Technical Specification 3rd Generation Partnership Project; Technical Specification Group Radio Access Network; Physical layer procedures (FDD) (Release 8), such as section 5.1.2.6, "Maximum and minimum power limits", as well as to 3GPP TS 25.321 V8.4.0 (2008-12) Technical Specification 3rd Generation Partnership Project; Technical Specification Group Radio Access Network; Medium Access Control (MAC) protocol specification (Release 8), such as section 11.8.1.4, "E-TFC Selection". Note further section 11.8.1.5, "Happy Bit Setting" of 3GPP TS 25.321.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the HSPA system, it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters are not intended to be limiting in any respect, as these parameters may be identified by any suitable names. Further, the various names assigned to different channels (e.g., HSUPA, E-DCH, E-RGCH, etc.) are not intended to be limiting in any respect, as these various channels may be identified by any suitable names.

Note also that while the multi-carrier UL transmission capability has been described above mainly in the context of two simultaneously transmitted carriers, in other exemplary embodiments there may be more than two simultaneously transmitted UL carriers.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
    receiving by a user equipment an indication that a first carrier is not received by a first base station and a second carrier is received by the first base station;
    assigning based on the received indication, by a processor, a maximum transmission power for the first carrier known to not be received by the first base station so as not to exceed a transmission power for the second carrier that is received by the first base station; and
    simultaneously transmitting from the user equipment on at least the first carrier and the second carrier after assigning the maximum transmission power for the first carrier,
    where transmitting on the first carrier is performed in accordance with the maximum assigned transmission power.

2. The method as in claim 1, where assigning the maximum transmission power for the first carrier is based at least in part on at least one rule related to a first path loss between the user equipment and the first base station and a second path loss between the user equipment and a second base station.

3. The method as in claim 2, where assigning the maximum transmission power for the first carrier uses one of: a transmit power back off offset as a function of a path loss ratio, and a maximum allowed grant as a function of the path loss ratio.

4. The method as in claim 2, where the second base station is a serving base station, and the method further comprises signaling on the first carrier to the serving base station that the serving base station may reduce grants on the first carrier.

5. The method as in claim 1, where assigning the maximum transmission power for the first carrier assigns the maximum transmission power such that the maximum transmission power does not exceed a transmission power for the second carrier, where the user equipment is configured to receive power control related commands from the first base station.

6. The method as in claim 1, where assigning the maximum transmission power assigns the maximum transmission power such that the maximum transmission power does not exceed an allowed transmission power for the second carrier.

7. The method as in claim 6, where a transmission power for the second carrier is less than the allowed transmission power.

8. The method of claim 1, further comprising:
    calculating a first path loss between the user equipment and the first base station;
    calculating a second path loss between the user equipment and a second base station; and
    sending the first path loss and the second path loss to a radio network controller.

9. The method as in claim 1, further comprising receiving instructions from a radio network controller to constrain the transmission power of the first carrier,
    where assigning the maximum transmission power is performed in response to receiving the instructions.

10. The method as in claim 1, executed during a soft handover procedure between the first base station and a serving base station, where the serving base station is configured to receive all of the plurality of carriers.

11. An apparatus, comprising at least one processor; and at least one memory including computer program code, the at least one memory and the computer program code configured to, with the at least one processor, cause the apparatus to perform at least the following:
    to receive an indication that a first carrier is not received by a first base station and a second carrier is received by the first base station;
    to assign based on the received indication a maximum transmission power for the first carrier known to not be received by the first base station so as not to exceed a transmission power for the second carrier that is received by the first base station; and
    to simultaneously transmit on at least the first carrier and the second carrier after assigning the maximum transmission power for the first carrier,
    where transmitting on the first carrier is performed in accordance with the maximum assigned transmission power.

12. The apparatus as in claim 11, where assigning the maximum transmission power for the first carrier is based at least in part on at least one rule related to a first path loss between a user equipment and the first base station and a second path loss between the user equipment and a second base station.

13. The apparatus as in claim 12, where assigning the maximum transmission power for the first carrier uses one of: a transmit power backoff offset as a function of a path loss ratio, and a maximum allowed grant as a function of the path loss ratio.

14. The apparatus as in claim 12, where the second base station is a serving base station, and the at least one memory and the computer program code further configured to, with the at least one processor, cause the apparatus to signal on the first carrier to the serving base station that the serving base station may reduce grants on the first carrier.

15. The apparatus as in claim 11, where assigning the maximum transmission power for the first carrier assigns the maximum transmission power such that the maximum transmission power does not exceed a transmission power for the second carrier, where the apparatus is configured to receive power control related commands from the first base station.

16. The apparatus as in claim 11, where assigning the maximum transmission power assigns the maximum transmission power such that the maximum transmission power does not exceed an allowed transmission power for the second carrier.

17. The apparatus as in claim 16, where a transmission power for the second carrier is less than the allowed transmission power.

18. The apparatus of claim 11, the at least one memory and the computer program code further configured to, with the at least one processor, cause the apparatus to perform at least the following:
- to calculate a first path loss between a user equipment and the first base station;
- to calculate a second path loss between the user equipment and a second base station; and
- to send the first path loss and the second path loss to a radio network controller.

19. The apparatus as in claim 11, the at least one memory and the computer program code further configured to, with the at least one processor, cause the apparatus to receive instructions from a radio network controller to constrain the transmission power of the first carrier, where assigning the maximum transmission power is performed in response to receiving the instructions.

20. A computer readable medium tangibly encoded with a computer program executable by a processor to perform actions comprising:
- receiving by a user equipment an indication that a first carrier is not received by a first base station and a second carrier is received by the first base station;
- assigning based on the received indication a maximum transmission power for the first carrier known to not be received by the first base station so as not to exceed a transmission power for the second carrier that is received by the first base station; and
- simultaneously transmitting from the user equipment on at least the first carrier and the second carrier after assigning the maximum transmission power for the first carrier,
- where transmitting on the first carrier is performed in accordance with the maximum assigned transmission power.

* * * * *